Nov. 6, 1951  R. M. SEDDON  2,574,420
SHOCK ABSORBER
Filed Aug. 30, 1949
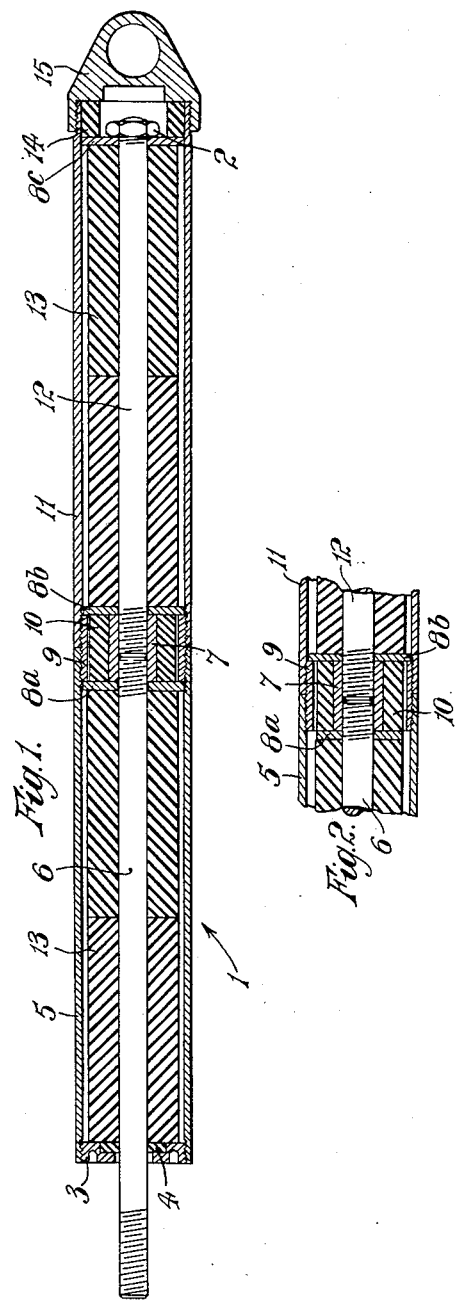

Patented Nov. 6, 1951

2,574,420

UNITED STATES PATENT OFFICE 2,574,420

SHOCK ABSORBER

Robert Maxwell Seddon, Walmley, Sutton Coldfield, England, assignor to Dunlop Rubber Company Limited, London County, England, a British company Application August 30, 1949, Serial No. 113,045
In Great Britain August 31, 1948

9 Claims. (Cl. 267—63)

This invention relates to shock absorbers, particularly for vehicles.

In certain vehicles suspension systems it is advantageous to have a shock absorber possessing, on expansion, shock absorbing characteristics which are different from those which it possesses on contraction.

It is an object of this invention to provide a shock absorber having such different characteristics.

According to the invention a shock absorber comprises coaxial inner and outer members axially movable with respect to each other and adapted to be connected to elements subject to relative displacement, a plurality of annular resilient members axially spaced apart from each other and carried by the inner members and means whereby all the resilient members are compressed when the inner and outer members are relatively displaced in one direction and part only of the resilient members are compressed when the inner and outer members are relatively displaced in the other direction.

Preferably shock absorbers in accordance with the invention comprise coaxial inner and outer members axially movable with respect to each other and adapted to be connected to elements subject to relative displacement, a set of axially spaced annular resilient members carried by the inner members, an abutment engaging with one end of said set and movable by the inner member on expansion of the device, a fixed abutment on the outer member engaging with the opposite ends of the set, and a separating unit between the ends of each pair of resilient members which comprises an annular spacer fixed to the inside of the outer member, a corresponding annular spacer fixed to the outside of the inner member, a washer engaging with the end of each spacer remote from the fixed abutment and forming an abutment for an end of one of the pair of resilient members, and another washer engaging with the other end of the inner spacer and forming an abutment for an end of the other of the pair of resilient members.

Two embodiments of the invention will now be described which comprise two resilient members, both of which are compressed when the device expands and only one of which is compressed when the device contracts.

In the accompanying drawings—

Fig. 1 is a sectional view of one shock absorber.

Fig. 2 is a sectional view of part of another shock absorber showing an alternative construction.

The shock absorber illustrated in Fig. 1 is denoted generally by the reference numeral 1.

The outer member comprises two co-axial tubes 5 and 11 of equal bore and outside diameter joined together by means of internal connection 9 having screw threads thereon which co-operate with screw threads in the bore of the adjoining ends of said tubes.

The end of the tube 11 remote from said connection is closed by a cap 15 secured thereon by means of screw threads. The end of the tube 5 remote from said connection has an annular bearing ring 3 secured therein by means of screw threads said ring having a circular cavity in its inner face in which is seated an annular rubber bush 4.

The inner member comprises two co-axial rods 6 and 12 of equal diameter joined together by means of a tapped collar 7 which co-operates with screw threads on the adjoining ends of said rods. The collar has the same length as the connection 9 for the outer member and in the in-operative position of the shock absorber has its ends flush with the ends of said connection.

The rod 12 extends from the collar 7 towards the closed end of the outer member and the rod 6 extends from the collar outside the outer member through the annular bearing ring 3.

Each member comprises two rubber tubes 13 of equal size and each rod carries one resilient member, there being a small clearance between the periphery of said rubber tubes and the bore of the outer member. Thus there is one resilient member on each side of the connection 9 and collar 7.

A washer 8a is interposed between the connection and the resilient member on the rod 6, and a washer 8b between the connection and the resilient member on the rod 12. A rubber annulus 10 is positioned on said collar between the said two washers.

Another washer 8c is located at the other end of the resilient member on the rod 12 and is retained in contact with said member by a lock-nut 2 secured to said rod by means of screw threads. A rubber annulus 14 is located between said washer and the cap 15 and surrounds said lock nut.

Preferably the length of the resilient members is such that they are compressed when assembled on the rods between the washers 8b and 8c in one case and between the washer 8a and the bearing ring 3 in the other case.

The operation of the shock absorber will now be described assuming the outer member to be fixed and the inner member movable.

When the shock absorber extends the resilient member on the rod 12 is compressed between the washer 8c and the washer 8b, and the resilient member on the rod 6 is compressed between the washer 8a and the bearing ring 3.

When the shock absorber contracts the resilient member on the rod 12 is compressed between the washers 8b and 8c. The resilient member on rod 6 is not subject to any such compression.

It will be understood that the compression referred to in describing the operation of the shock absorber is additional to the stresses imposed during its assembly, these stresses being present even when it is not under load.

In an alternative arrangement, shown in Fig. 2, the washer 8a on the rod 6 has a smaller diameter than the bore of the connection 9 and is slidable therein. Thus when the shock absorber contracts the inherent compression in the resilient member on the rod 6 supplies further compressive force to the resilient member on the rod 12.

The rubber tubes forming the resilient member may be replaced by a plurality of rubber elements spaced apart by rigid discs of metal or synthetic material.

In the shock absorber hereinbefore described the compressive load in one direction is shared by both the resilient members, but in the other direction one resilient member receives the full load. Such shock absorbers are applicable to towing struts or to vehicle suspension systems, and particularly suitable for the rear wheel suspension of a motor cycle of the type described in my co-pending application Serial Number 113,046, filed August 30, 1948.

Although, in the embodiment herein described, the resilient members are of equal length, a shock absorber in accordance with the invention may have resilient members which are unequal in length.

Having described my invention, what I claim is:

1. A shock absorber comprising coaxial inner and outer members axially movable with respect of each other and adapted to be connected to elements subject to relative displacement, a set of axially disposed annular resilient members carried by the inner member, an abutment engaging with one end of said set and movable by the inner member on expansion of the device, a fixed abutment on the outer member engaging with the opposite end of the set, and a separating unit between the ends of each pair of resilient members which comprises an annular spacer fixed to the inside of the outer member, a corresponding annular spacer fixed to the outside of the inner member, a washer engaging with the end of each spacer remote from the fixed abutment and forming an abutment for an end of one of the pair of resilient members, and another washer engaging with the other end of the inner spacer and forming an abutment for an end of the other of the pair of resilient members.

2. A shock absorber according to claim 1 wherein both washers engage with the ends of the inner and outer spacers.

3. A shock absorber according to claim 1 which comprises only one pair of resilient members.

4. A shock absorber according to claim 1 wherein the free length of each resilient member is greater than its length when assembled whereby said member is placed under compression.

5. A shock absorber comprising coaxial inner and outer members axially movable with respect to each other and adapted to be connected to elements subject to relative displacement, a plurality of resilient members carried by the inner member, compression means comprising a fixed abutment on the outer member engaging with one end of the plurality of resilient members and an abutment engaging with the other end of the plurality of resilient members and movable with the inner member in a direction toward the fixed abutment, and at least one separating unit separating the resilient members into at least two axially extending sections, each unit comprising an outer spacer fixed to the inside of the outer member, a corresponding inner spacer fixed to the inner member, a washer engaging with the end of each spacer remote from the fixed abutment and forming an abutment for the end of one section of the resilient members and a washer engaging with the other end of the inner spacer and forming an abutment for an end of another section of the resilient members.

6. A shock absorber according to claim 5 wherein the washer engaging with the end of the inner spacer adjacent the fixed abutment engages also the corresponding end of the outer spacer.

7. A shock absorber according to claim 5 which comprises only two sections of resilient members.

8. A shock absorber according to claim 5 wherein the free length of each resilient member is greater than its length when assembled whereby said member is placed under compression.

9. A shock absorber according to claim 5 wherein the coaxial outer member is tubular, the resilient members are of annular cross section, the fixed abutment comprises an inwardly extending annular flange at one end of the tubular outer member and the movable abutment comprises a washer disposed on the coaxial inner member at the end of the said resilient members remote from the fixed abutment.

ROBERT MAXWELL SEDDON.

REFERENCES CITED

The following references are of record in the file of this patent:

UNITED STATES PATENTS

| Number | Name | Date |
|---|---|---|
| 1,791,484 | Dowty | Feb. 3, 1931 |
| 2,323,667 | Saurer | Feb. 18, 1941 |
| 2,486,741 | Gabriel | Nov. 1, 1949 |